United States Patent [19]

Yoshimura

[11] Patent Number: 5,793,917
[45] Date of Patent: Aug. 11, 1998

[54] APPARATUS FOR COMPENSATING FOR DISPERSION IN SUBMARINE OPTICAL AMPLIFICATION AND TRANSMISSION SYSTEM

[75] Inventor: Junichi Yoshimura, Kawasaki, Japan

[73] Assignee: Fujitsu Limited, Kanagawa, Japan

[21] Appl. No.: 616,974

[22] Filed: Mar. 18, 1996

[30] Foreign Application Priority Data

Mar. 17, 1995 [JP] Japan .................. 7-059027

[51] Int. Cl.$^6$ .................. G02B 6/44
[52] U.S. Cl. .................. 385/100; 385/27; 385/24; 385/31; 359/333; 359/341
[58] Field of Search .................. 385/100, 122, 385/123, 24.5, 31, 27; 359/115, 124, 127, 341, 333

[56] References Cited

U.S. PATENT DOCUMENTS 5,559,920 9/1996 Chraplyvy et al. .................. 385/123 X

FOREIGN PATENT DOCUMENTS 62-275204 11/1987 Japan .

*Primary Examiner*—Phan T. H. Palmer
*Attorney, Agent, or Firm*—Helfgott & Karas, P.C.

[57] ABSTRACT

A dispersion compensating apparatus compensates for a dispersion which occurs in a submarine optical fiber transmission system that operates on optical amplification relay principles for the purpose of easily repairing an optical fiber cable and dispersion compensating cables. A plurality of optical amplifiers are placed in the optical fiber cable. The dispersion compensating cables are housed in the casing of each of those of the optical amplifiers which are positioned at dispersion compensating intervals over the optical fiber cable. The dispersion compensating intervals range from about 500 to 1000 km, for example, with a certain tolerance. The optical amplifiers are positioned at intervals of several tens km, for example, and are located within that tolerance. Each of the dispersion compensating fibers has a length in the range of from 20 to 30 km, and is wound around a bobbin.

12 Claims, 17 Drawing Sheets

| TEMPERATURE (°C) | TEMPERATURE-DEPENDENCY OF WAVELENGTH DISPERSION CAUSED BY REPEATER SPANS (ps/km/nm) | | | | | | | | |
|---|---|---|---|---|---|---|---|---|---|
| | RS1 | RS2 | RS3 | RS4 | ... | RSn-2 | RSn-1 | RSn |
| 2 | −0.7 | −0.8 | −0.7 | −0.7 | ... | −0.6 | −0.6 | −0.7 |
| 5 | −0.6 | −0.7 | −0.6 | −0.7 | ... | −0.6 | −0.5 | −0.6 |
| 10 | −0.5 | −0.6 | −0.6 | −0.6 | ... | −0.5 | −0.5 | −0.5 |
| ... | ... | ... | ... | ... | ... | ... | ... | ... |
| 40 | +0.5 | +0.4 | +0.4 | +0.4 | ... | +0.4 | +0.5 | +0.5 |

FIG. 12

| TOTAL DISPERSION COMPENSATION (ps/km/nm) | TEMPERATURE FOR TEMPERATURE-CONTROLLED BATH (°C) |
|---|---|
| +0.9 | +60 |
| +0.8 | +53 |
| +0.7 | +45 |
| ...... | ...... |
| -0.9 | 0 |

FIG. 13

APPARATUS FOR COMPENSATING FOR DISPERSION IN SUBMARINE OPTICAL AMPLIFICATION AND TRANSMISSION SYSTEM

BACKGROUND OF THE INVENTION

1. Field of the Invention:

The present invention relates to an apparatus for compensating for a dispersion in a submarine optical amplification and transmission system, and more particularly to a dispersion compensating apparatus for compensating for a wavelength dispersion which occurs in a submarine optical fiber transmission system that operates on optical amplification relay principles.

2. Description of the Related Art:

International communications have been carried out through optical fiber cables laid undersea. Optical signals that are transmitted through the optical fiber cables are processed by repeaters which are placed at spaced locations in the optical fiber cables. To meet growing demands for ultra-high-speed and high-capacity transmission, the design of repeaters has recently been going through a shift from the regenerative relay principles to the optical amplification relay principles. However, the optical amplification relay system suffers a signal degradation due to accumulated wavelength dispersions, which the regenerative relay system has not been subjected to, and it has been desirable to solve this problem. Specifically, since an optical fiber transmission system that operates on the optical amplification relay principles directly optically amplifies and transmits an optical signal over a long distance, the transmitted optical signal is caused to contain accumulated wavelength dispersions, and hence tends to be degraded in quality.

As shown in FIG. 16 of the accompanying drawings, a conventional optical fiber transmission system operating on the regenerative relay principles comprises an optical fiber cable 103 laid between a terminal station 101 and another terminal station 102, and a plurality of regenerative repeaters 104a–104n that are placed at intervals of several tens km in the optical fiber cable 103. Each of the regenerative repeaters 104a–104n converts a received optical signal into an electric signal, reshapes, retimes, and amplifies the electric signal with electric circuits, and thereafter converts the processed electric signal back to an optical signal for transmission. A waveform dispersion (hereinafter referred to simply as a "dispersion") which is created in the optical signal by the optical fiber cable 103 is canceled each time the optical signal is processed by one of the regenerative repeaters 104a–104n, and causes no significant problem with respect to the signal quality.

As shown in FIG. 17 of the accompanying drawings, a conventional optical fiber transmission system operating on the optical amplification relay principles comprises an optical fiber cable 103 laid between a terminal station 101 and another terminal station 102, and a plurality of optical amplification repeaters 105a–105n that are placed at intervals of several tens km in the optical fiber cable 103. Each of the optical amplification repeaters 105a–105n directly amplifies a received optical signal through optical pumping with an erbium-doped fiber or the like. Since an optical signal introduced from the terminal station 101 is transmitted as it is from the terminal station 101 to the terminal station 102, the transmitted optical signal is subjected to the dispersing property of the optical fiber, and is degraded so much that it will eventually be unidentifiable at the terminal station 102.

To prevent the optical signal from being degraded, it has been proposed to insert dispersion compensating fiber cables 106a–106m at intervals ranging from about 500 to 1000 km in the optical fiber cable 103, as disclosed in Japanese laid-open patent publication No. 62-275204, for example. Each of the dispersion compensating fiber cables 106a–106m comprises a single-mode fiber having a dispersion coefficient whose sign is opposite to the sign of the dispersion coefficient of the existing line (the optical fiber cable 103) at the transmitted wavelength and which is uniform in the longitudinal direction of the dispersion compensating fiber cable. Each of the dispersion compensating fiber cables 106a–106m has a length in the range of from 20 to 30 km. If a zero-dispersion wavelength for the optical fiber cable 103 is 1560 nm and a transmitted optical wavelength is 1555 nm (a wavelength with a minimum transmission loss and a zero-dispersion wavelength are not necessarily in conformity with each other), then the wavelength of an optical signal transmitted through the optical fiber cable 103 suffers a negative dispersion. When an optical signal transmitted from the terminal station 101 travels through the optical fiber cable 103 over a distance ranging from about 500 to 1000 km, the optical signal wavelength suffers an accumulated dispersion 107. When the optical signal then travels through the dispersion compensating fiber cable 106a, for which a zero-dispersion wavelength is 1300 nm, the optical signal wavelength undergoes a positive dispersion. After having passed through the length of 20 to 30 km of the dispersion compensating fiber cable 106a, the wavelength dispersion 107 of the optical signal is canceled out and becomes nil.

However, as shown in FIG. 17, wavelength dispersions 109, 108 of optical signals that are received by the respective terminal stations 101, 102 may not necessarily be eliminated. Even if the optical fiber transmission system was initially designed such that the wavelength dispersions 109, 108 were nil, any subsequent changes in the lengths of the optical fiber cable 103 and the dispersion compensating fiber cables 106a–106m due to cable repairs prevent the wavelength dispersions 109, 108 from becoming nil.

Another problem is that a process of repairing the optical fiber cable 103 and the dispersion compensating fiber cables 106a–106m is tedious and time-consuming because the type of any fiber cable that needs to be repaired cannot be identified until it is lifted up to the maintenance ship.

It has been desired to cope with aging- and temperature-depending changes of dispersions caused by the optical fiber cable 103 and the dispersion compensating fiber cables 106a–106m.

SUMMARY OF THE INVENTION

It is a first object of the present invention to provide a dispersion compensating apparatus which is capable of compensating for a dispersion caused in a submarine optical amplification and transmission system at a terminal station thereof.

A second object of the present invention is to provide a dispersion compensating apparatus which allows an optical fiber cable and dispersion compensating fiber cables of a submarine optical amplification and transmission system to be easily repaired.

A third object of the present invention is to provide a dispersion compensating apparatus which is capable of coping with aging- and temperature-depending changes of dispersions caused by an optical fiber cable and dispersion compensating fiber cables of a submarine optical amplification and transmission system.

To achieve the above objects, there is provided in accordance with an aspect of the present invention an apparatus for compensating for a dispersion which occurs in a submarine optical amplification and transmission system that operates on optical amplification relay principles, comprising an optical fiber cable extending between two terminal stations, a plurality of optical amplifiers placed in the optical fiber cable, the optical amplifiers having respective casings, and a dispersion compensating fiber housed in the casing of each of those of the optical amplifiers which are positioned at dispersion compensating intervals over the optical fiber cable.

According to another aspect of the present invention, there is provided an apparatus for compensating for a dispersion which occurs in a submarine optical amplification and transmission system that operates on optical amplification relay principles, comprising an optical fiber cable extending between two terminal stations, a plurality of joint devices placed in the optical fiber cable, the joint devices having respective casings, and a dispersion compensating fiber housed in the casing of each of those of the joint devices which are positioned at dispersion compensating intervals over the optical fiber cable.

According to still another aspect of the present invention, there is provided an apparatus for compensating for a dispersion which occurs in a submarine optical amplification and transmission system that operates on optical amplification relay principles, comprising a terminal station connected to an optical fiber cable, the terminal station having a receiver, a dispersion compensating fiber disposed in the receiver, and optical amplifying means disposed in the receiver, for amplifying an attenuation caused by the dispersion compensating fiber.

According to yet still another aspect of the present invention, there is provided an apparatus for compensating for a dispersion which occurs in a submarine optical amplification and transmission system that operates on optical amplification relay principles, comprising an optical fiber cable extending between two terminal stations each having a receiver, a plurality of optical amplification repeaters placed in the optical fiber cable, a dispersion compensating fiber disposed in the receiver, temperature maintaining means for maintaining the dispersion compensating fiber at a predetermined temperature, temperature collecting means disposed in one of the terminal stations, for collecting temperature information of seawater near the optical amplification repeaters from the optical amplification repeaters, calculating means disposed in the one of the terminal stations, for calculating a deviation of a dispersion caused by the optical fiber cable from a reference value by referring to a correlation table of temperatures and dispersions based on the temperature information collected by the temperature collecting means, and temperature controlling means disposed in the one of the terminal stations, for controlling the predetermined temperature maintained by the temperature maintaining means based on the deviation calculated by the calculating means.

According to a further aspect of the present invention, there is provided an apparatus for compensating for a dispersion which occurs in a submarine optical amplification and transmission system that operates on optical amplification relay principles, comprising an optical fiber cable extending between two terminal stations each having a receiver, a dispersion compensating fiber disposed in the receiver, temperature maintaining means for maintaining the dispersion compensating fiber at a predetermined temperature, requesting means disposed in one of the terminal stations, for requesting the other of the terminal stations to sent a dispersion measuring signal, dispersion detecting means disposed in the one of the terminal stations, for detecting a dispersion caused by the optical fiber cable at a location where the one of the terminal stations is connected to the optical fiber cable, based on the dispersion measuring signal sent from the other of the terminal stations, and temperature controlling means for controlling the predetermined temperature maintained by the temperature maintaining means based on the dispersion detected by the dispersion detecting means.

According to a still further aspect of the present invention, there is provided an apparatus for compensating for a dispersion which occurs in a submarine optical amplification and transmission system that operates on optical amplification relay principles, comprising an optical fiber cable extending between two terminal stations each having a receiver, a plurality of optical amplification repeaters placed in the optical fiber cable, the optical amplification repeaters having respective casings, a dispersion compensating fiber housed in the casing of each of those of the optical amplification repeaters which are positioned at dispersion compensating intervals over the optical fiber cable, a second dispersion compensating fiber disposed in the receiver, optical amplifying means disposed in the receiver, for amplifying an attenuation caused by the second dispersion compensating fiber, temperature maintaining means for maintaining the second dispersion compensating fiber at a predetermined temperature, temperature collecting means disposed in one of the terminal stations, for collecting temperature information of seawater near the optical amplification repeaters from the optical amplification repeaters, calculating means disposed in the one of the terminal stations, for calculating a deviation of a dispersion caused by the optical fiber cable from a reference value by referring to a correlation table of temperatures and dispersions based on the temperature information collected by the temperature collecting means, and temperature controlling means disposed in the one of the terminal stations, for controlling the predetermined temperature maintained by the temperature maintaining means based on the deviation calculated by the calculating means.

According to a yet still further aspect of the present invention, there is provided an apparatus for compensating for a dispersion which occurs in a submarine optical amplification and transmission system that operates on optical amplification relay principles, comprising an optical fiber cable extending between two terminal stations each having a receiver, a plurality of joint devices placed in the optical fiber cable, the joint devices having respective casings, a dispersion compensating fiber housed in the casing of each of those of the joint devices which are positioned at dispersion compensating intervals over the optical fiber cable, a plurality of optical amplification repeaters placed in the optical fiber cable, a second dispersion compensating fiber disposed in the receiver, optical amplifying means disposed in the receiver, for amplifying an attenuation caused by the second dispersion compensating fiber, temperature maintaining means for maintaining the second dispersion compensating fiber at a predetermined temperature, temperature collecting means disposed in one of the terminal stations, for collecting temperature information of seawater near the optical amplification repeaters from the optical amplification repeaters, calculating means disposed in the one of the terminal stations, for calculating a deviation of a dispersion caused by the optical fiber cable from a reference value by referring to a correlation table of temperatures and dispersions based on the temperature information collected by the temperature collecting means, and temperature controlling means disposed in the one of the terminal stations, for controlling the predetermined temperature maintained by the temperature maintaining means based on the deviation calculated by the calculating means.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 12 is a correlation table of ambient temperatures and dispersions caused by respective repeater spans;

FIG. 13 is a conversion table of temperatures and dispersions caused by a dispersion compensating fiber;

DETAILED DESCRIPTION OF THE PREFERRED EMBODIMENTS

An apparatus for compensating for a dispersion in a submarine optical amplification and transmission system according to a first embodiment of the present invention will be described below with reference to FIGS. 1, 4, and 5.

Figure 1:
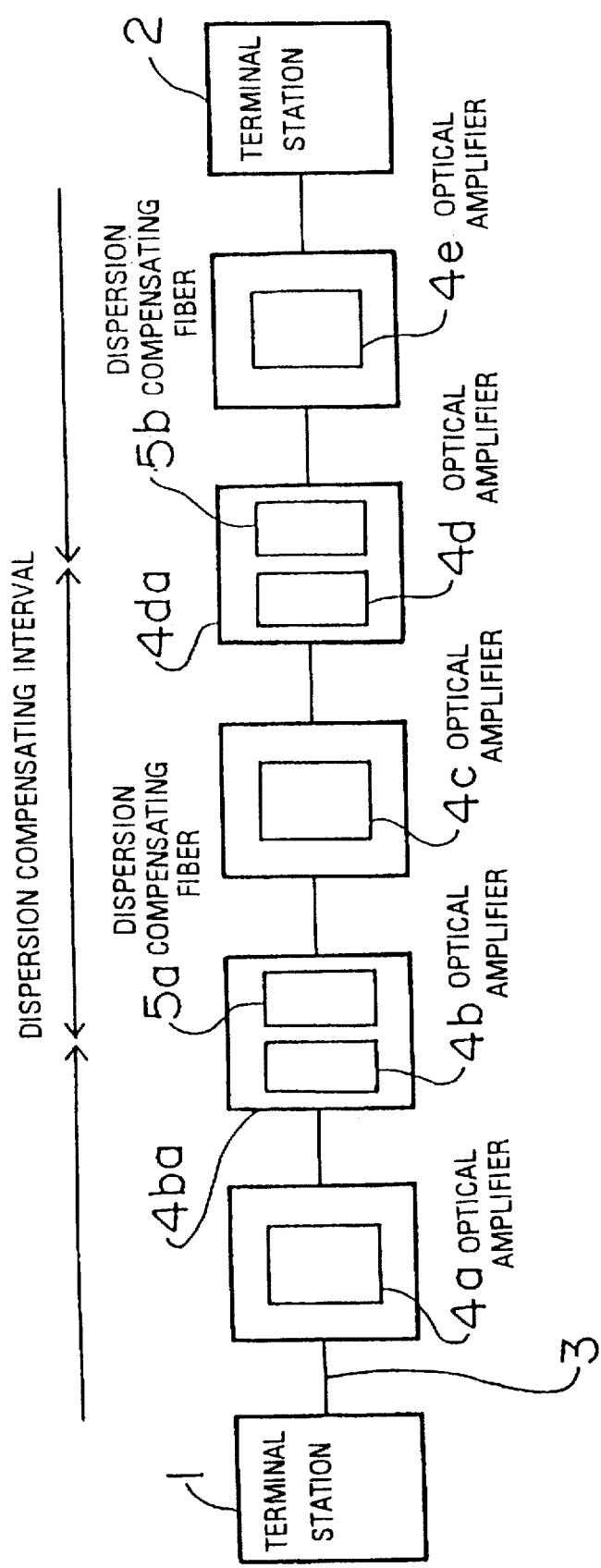
FIG. 1 is a block diagram illustrative of a first principle according to the present invention.

FIG. 1 shows a first principle according to the present invention, and the dispersion compensating apparatus according to the first embodiment is based on the first principle shown in FIG. 1.

As shown in FIG. 1, a submarine optical amplification and transmission system comprises an optical fiber cable 3 laid between two terminal stations 1, 2, a plurality of optical amplifiers 4a–4e placed at spaced locations in the optical fiber cable 3, and two dispersion compensating fibers 5a, 5b mounted in respective casings 4ba, 4da which also house the optical amplifiers 4b, 4d, respectively, that are positioned at dispersion compensating intervals over the optical fiber cable 3. The optical amplifiers 4a–4e are placed at intervals of several tens km, for example, in the optical fiber cable 3. Each of the dispersion compensating fibers 5a, 5b comprises a single-mode fiber having a dispersion coefficient whose sign is opposite to the sign of the dispersion coefficient of the existing line (the optical fiber cable 3) at the transmitted wavelength and which is uniform in the longitudinal direction of the dispersion compensating fiber. Each of the dispersion compensating fibers 5a, 5b has a length in the range of from 20 to 30 km, and is wound around a bobbin in a compact structure. The structure of each of the dispersion compensating fibers 5a, 5b will be described later on with reference to FIG. 5.

The dispersion compensating fibers 5a, 5b are housed in the respective casings 4ba, 4da which also accommodate the optical amplifiers 4b, 4d, respectively, that are positioned at dispersion compensating intervals over the optical fiber cable 3, among the optical amplifiers 4a–4e placed in the optical fiber cable 3. The dispersion compensating intervals are in the range from about 500 to 1000 km, for example, with a certain tolerance. The optical amplifiers 4b, 4d are located within that tolerance.

Since the dispersion compensating fibers 5a, 5b are housed in the respective casings 4ba, 4da, the submarine cable that is to be repaired is only the optical fiber cable 3, and hence a process of repairing the optical fiber cable 3 is highly facilitated.

Figure 4:
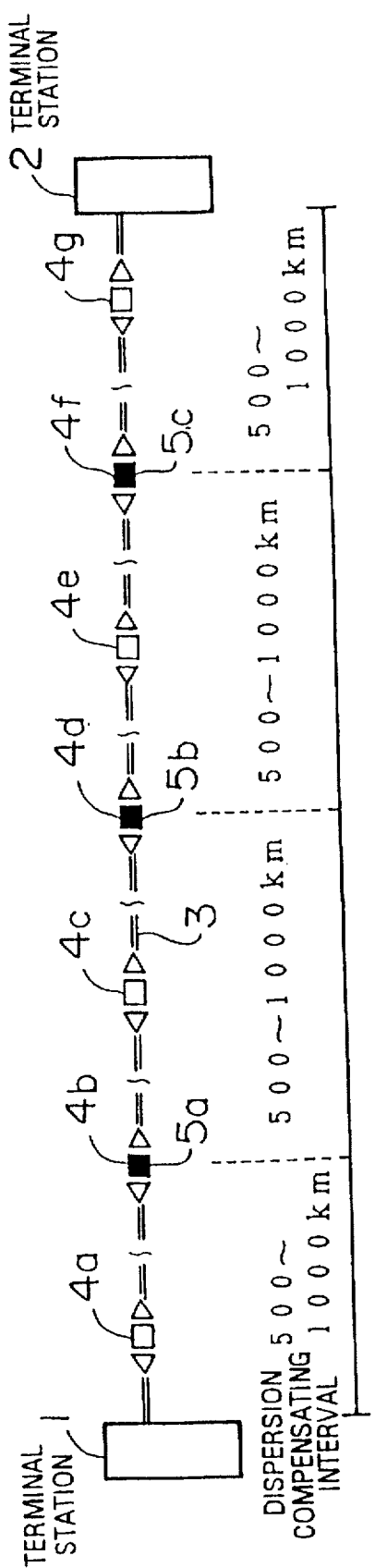
FIG. 4 is a schematic diagram of an apparatus for compensating for a dispersion in a submarine optical amplification and transmission system according to a first embodiment of the present invention.

FIG. 4 schematically shows in specific detail the dispersion compensating apparatus according to the first embodiment of the present invention. As shown in FIG. 4, a plurality of optical amplifiers 4a–4g are placed at spaced locations in an optical fiber cable 3, and dispersion compensating fibers 5a, 5b, 5c are housed in respective repeater casings which also accommodate the optical amplifiers 4b, 4d, 4f. Each of the optical amplifiers 4a–4g is disposed in a repeater casing.

Figure 5:
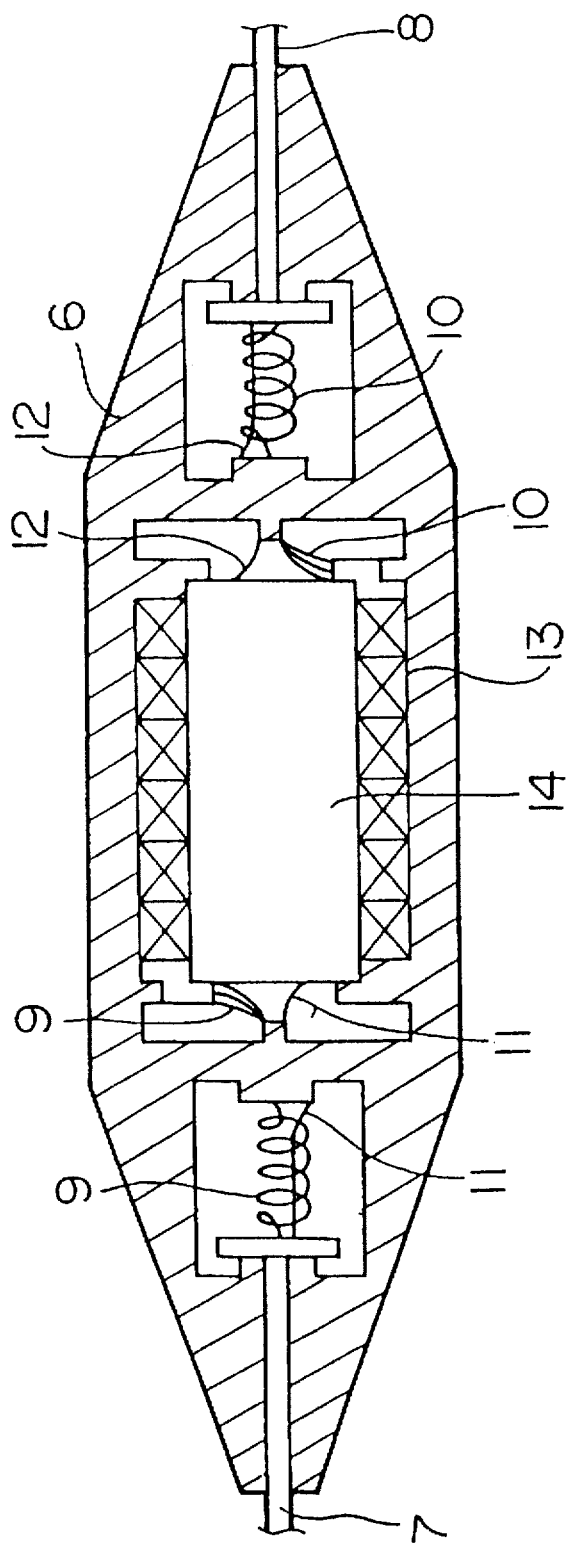
FIG. 5 is an enlarged longitudinal cross-sectional view of a repeater in the submarine optical amplification and transmission system shown in FIG. 4.

FIG. 5 shows in enlarged longitudinal cross section a repeater in the dispersion compensating apparatus shown in FIG. 4, the repeater housing an optical amplifier and dispersion compensating fibers. As shown in FIG. 5, optical fiber cables 7, 8 have ends fitted respectively in opposite ends of a repeater casing 6, and are composed of three pairs of six optical fibers 9 and three pairs of six optical fibers 10, respectively, and feed lines 11, 12, respectively. The repeater casing 6 houses a bobbin 13 which comprises six parallel bobbin units and an amplifier unit 14 which comprises six amplifier circuits. Dispersion compensating fibers are wound around the bobbin units, respectively, and have ends connected to the respective six optical fibers 9. The opposite ends of the dispersion compensating fibers wound around the bobbin units are connected to input terminals, respectively, of the six amplifier circuits of the amplifier unit 14. The six amplifier circuits of the amplifier unit 14 have respective output terminals connected to the respective six optical fibers 10. Each of the dispersion compensating fibers wound around the bobbin units has a length ranging from about 20 to 30 km. The six amplifier circuits of the amplifier unit 14 comprise respective optical amplifiers which are supplied with electric energy from one of the feed lines 11, 12. The other of the feed lines 11, 12 supplies electric energy to the amplifier unit in an adjacent repeater.

Figure 6:
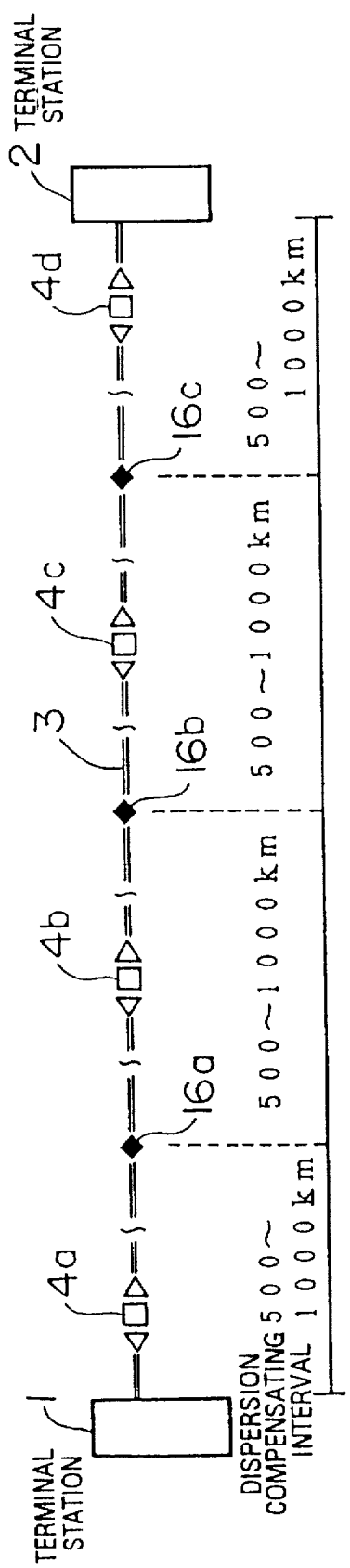
FIG. 6 is a schematic diagram of an apparatus for compensating for a dispersion in a submarine optical amplification and transmission system according to a second embodiment of the present invention.

FIG. 6 schematically shows in specific detail a dispersion compensating apparatus according to a second embodiment of the present invention. The dispersion compensating apparatus according to the second embodiment is basically the same as the dispersion compensating apparatus according to the first embodiment. Those parts of the dispersion compensating apparatus according to the second embodiment which are identical to those of the dispersion compensating apparatus according to the first embodiment are denoted by identical reference characters, and will not be described in detail below.

According to the second embodiment, as shown in FIG. 6, a plurality of optical amplifiers 4a–4d are placed at spaced locations in an optical fiber cable 3, and a plurality of joint boxes 16a–16c are also placed at spaced locations in the optical fiber cable 3. It is the customary practice to handle the optical fiber cable 3 in unit cable lengths that can easily be manufactured and transported, transport unit cable lengths with a ship, and splice them when they are laid undersea. Generally, the unit cable lengths are spliced through joint boxes. The joint boxes 16a–16c, which are positioned at dispersion compensating intervals over the optical fiber cable 3, of all those joint boxes accommodate respective dispersion compensating fibers.

Inasmuch as the dispersion compensating fibers are housed in the respective joint boxes 16a–16c, the submarine cable that is to be repaired is only the optical fiber cable 3, and hence a process of repairing the optical fiber cable 3 is highly facilitated.

Figure 7:
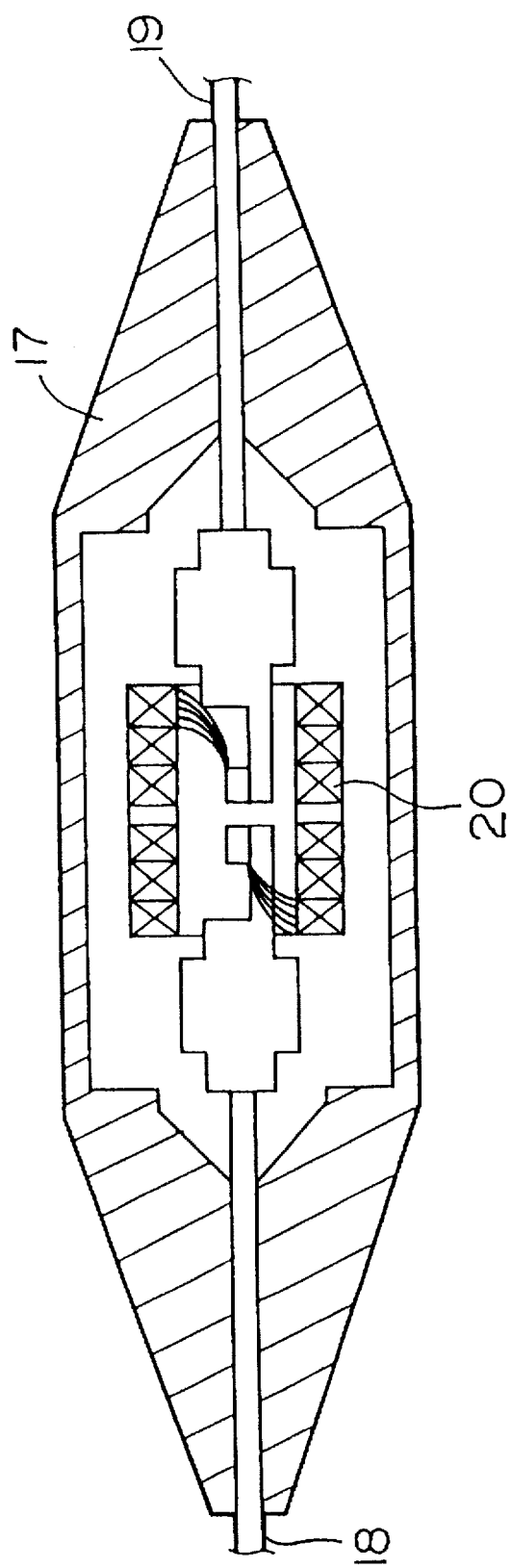
FIG. 7 is an enlarged longitudinal cross-sectional view of a joint box in the submarine optical amplification and transmission system shown in FIG. 6.

FIG. 7 shows in enlarged longitudinal cross section a joint box in the dispersion compensating apparatus shown in FIG. 6. As shown in FIG. 7, optical fiber cables 18, 19 have ends fitted respectively in opposite ends of a joint box 17, and are each composed of three pairs of six optical fibers, for example. The joint box 17 houses a bobbin 20 which comprises six parallel bobbin units. Dispersion compensating fibers are wound around the bobbin units, respectively, and have ends connected to the respective six optical fibers of the optical fiber cable 18. The opposite ends of the dispersion compensating fibers wound around the bobbin units are connected to the respective six optical fibers of the optical fiber cable 19. Each of the dispersion compensating fibers wound around the bobbin units has a length ranging from about 20 to 30 km.

An apparatus for compensating for a dispersion in a submarine optical amplification and transmission system according to a third embodiment of the present invention will be described below with reference to FIGS. 2 and 8. The third embodiment resides in an arrangement of a terminal station.

Figure 2:
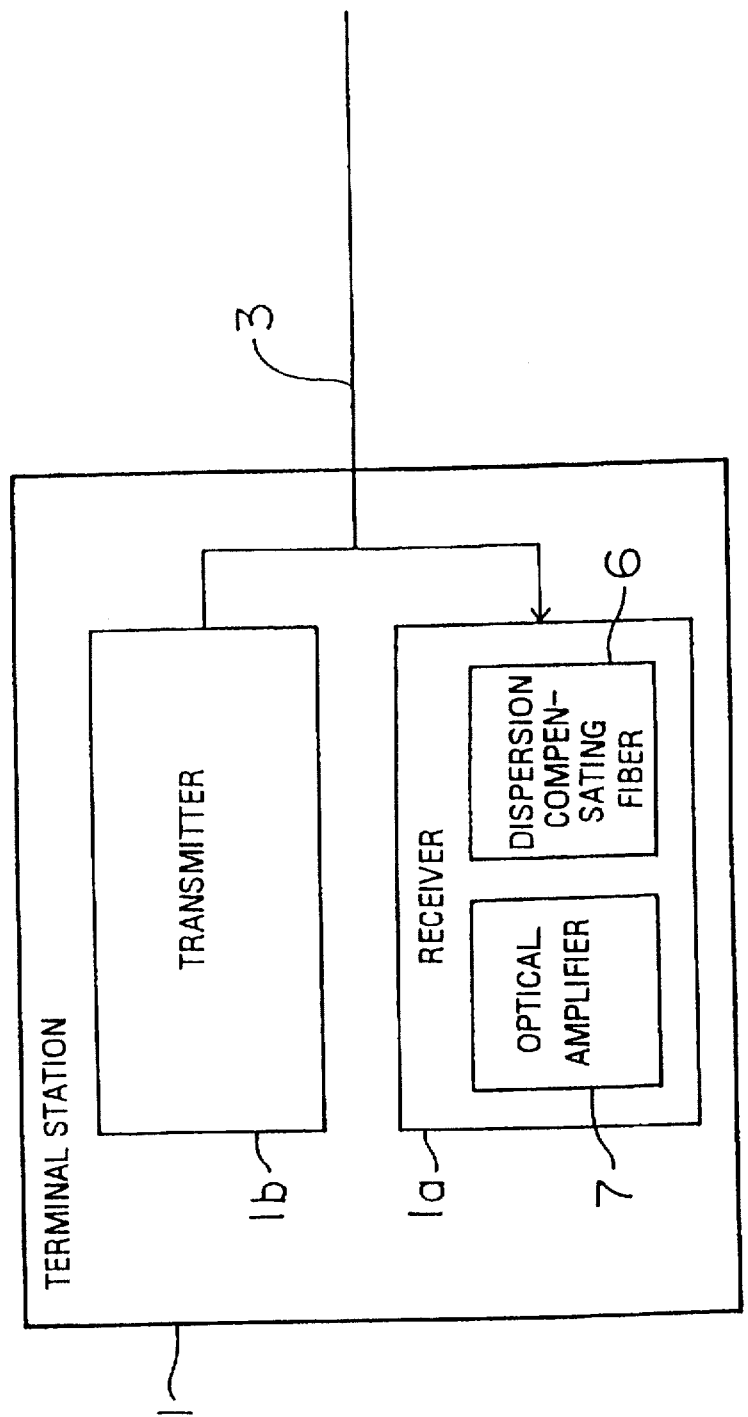
FIG. 2 is a block diagram illustrative of a second principle according to the present invention.

FIG. 2 shows a second principle according to the present invention, and the dispersion compensating apparatus according to the third embodiment is based on the second principle shown in FIG. 2.

Figure 17:
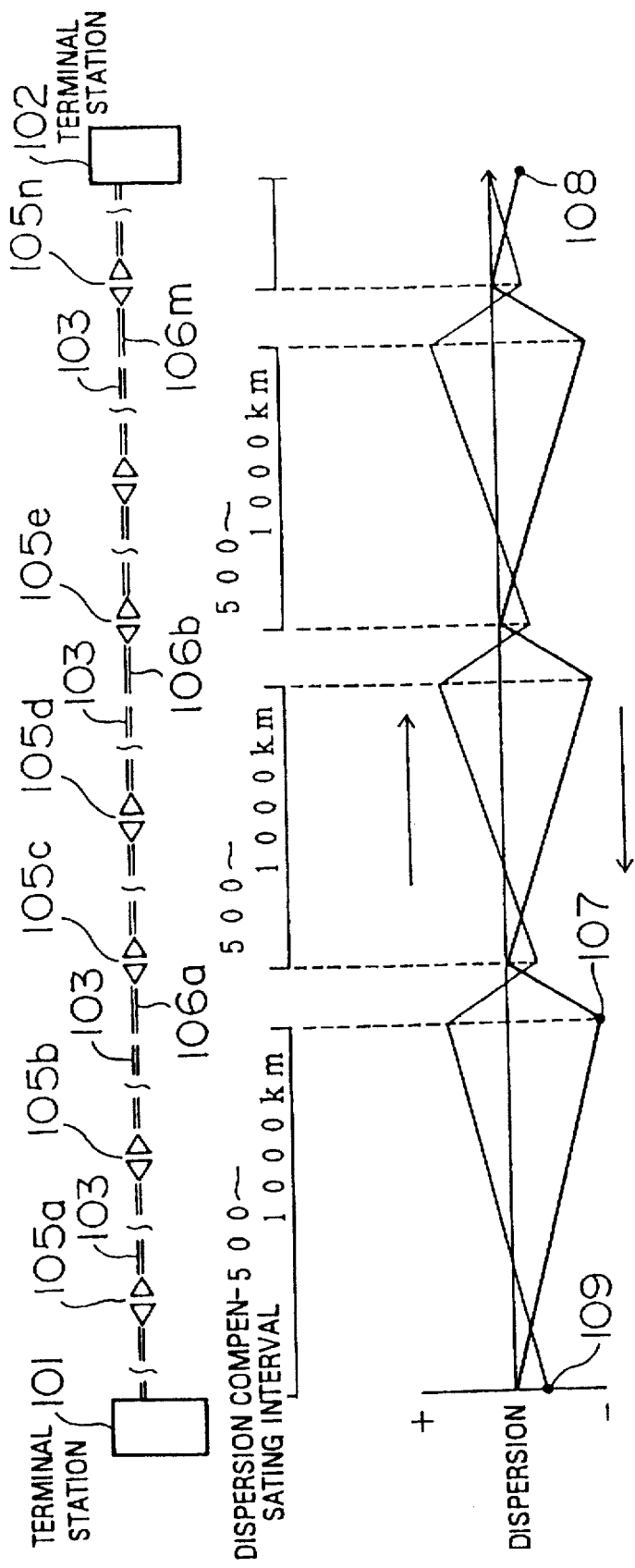
FIG. 17 is a schematic diagram of a conventional optical fiber transmission system operating on the optical amplification relay principles.

As shown in FIG. 2, the dispersion compensating apparatus comprises a terminal station 1 connected to an optical fiber cable 3 and having a receiver 1a and a transmitter 1b. The receiver 1a includes a dispersion compensating fiber 6 and an optical amplifier 7 for amplifying an attenuation caused by the dispersion compensating fiber 6. The dispersion compensating fiber 6 comprises a single-mode fiber having a dispersion coefficient whose sign is opposite to the sign of the dispersion coefficient of the existing line (the optical fiber cable 3) at the transmitted wavelength and which is uniform in the longitudinal direction of the dispersion compensating fiber. The dispersion compensating fiber 6 has a maximum length in the range of from 20 to 30 km which may be adjusted to cancel out a dispersion (corresponding to the dispersion 109 shown in FIG. 17) caused by the optical fiber cable 3 as viewed from the receiver 1a. The dispersion compensating fiber 6 is wound around a bobbin in a compact structure.

With the above arrangement, the receiver 1a in the terminal station 1 has the dispersion compensating fiber 6 and the optical amplifier 7 for amplifying an attenuation caused by the dispersion compensating fiber 6. It is possible for the dispersion compensating fiber 6, whose length has been adjusted in advance, to cancel out a dispersion (corresponding to the dispersion 109 shown in FIG. 17) caused by the optical fiber cable 3 as viewed from the receiver 1a.

Figure 8:
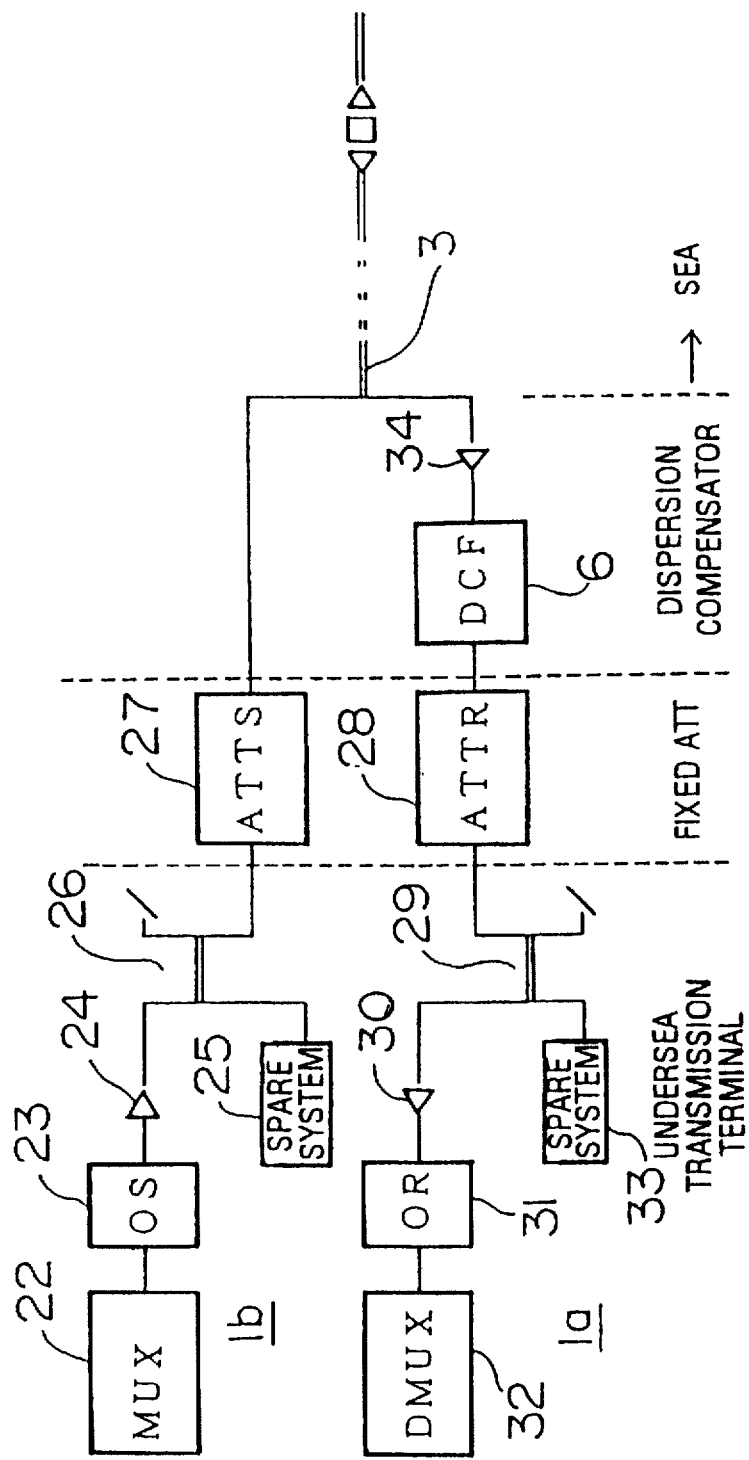
FIG. 8 is a block diagram of an apparatus for compensating for a dispersion in a submarine optical amplification and transmission system according to a third embodiment of the present invention.

FIG. 8 shows in detailed block form the dispersion compensating apparatus according to the third embodiment of the present invention. As shown in FIG. 8, the transmitter 1b has a multiplexer (MUX) 22 for multiplexing a plurality of channel signals transmitted from a transmission network on land, an optical transmitter (OS) 23 for converting a multiplexed electric signal into an optical signal, and a postamplifier 24 for optically amplifying the optical signal up to a line signal level. The transmitter 1b also includes a cold-standby spare system 25 composed of elements which correspond respectively to the multiplexer 22, the optical transmitter 23, and the postamplifier 24, thus providing a redundant structure. The multiplexer 22, the optical transmitter 23, and the postamplifier 24, which constitute an active system, and the spare system 25 are connected through an optical coupler 26 to a transmission attenuator (ATTS) 27. The optical coupler 26 comprises a fiber-fused coupler. The transmission attenuator 27 serves to adjust an interface level between the transmitter 1b and the undersea transmission line of the optical fiber cable 3 and send an optical signal from the optical coupler 26 to the optical fiber cable 3.

The receiver 1a has a reception attenuator (ATTR) 28 for adjusting an interface level between the receiver 1a and the undersea transmission line of the optical fiber cable 3, and an optical coupler 29 for directing a received optical signal from the reception attenuator 28 to an active system or a spare system. The active system comprises a preamplifier 30, an optical receiver (OR) 31, and a demultiplexer (DMUX) 32 which have respective conversion functions that are a reversal of the functions of the multiplexer 22, the optical transmitter 23, and the postamplifier 24 of the receiver 1b, for sending a plurality of channel signals to the transmission network on land. The spare system, which comprises a cold-standby spare system 33, is composed of elements which correspond respectively to the preamplifier 30, the optical receiver 31, and the demultiplexer 32, thus providing a redundant structure.

The receiver 1a also includes a dispersion compensating fiber 6 and an amplifier 34 which are connected between the reception attenuator 28 and the optical fiber cable 3. The dispersion compensating fiber 6 has its length adjusted to cancel out a dispersion (corresponding to the dispersion 109 shown in FIG. 17) caused by the optical fiber cable 3 as viewed from the receiver 1a. The amplifier 34 comprises an optical amplifier for optically amplifying an attenuation caused by the dispersion compensating fiber 6.

The optical fiber cable 3 is combined with the conventional dispersion compensating fibers, or the dispersion compensating fibers 5a–5c according to the first embodiment, or the dispersion compensating fibers 16a–16c according to the second embodiment, for dispersion compensation. A dispersion brought about by the optical fiber cable 3 as viewed from the receiver 1a, which amounts to a value corresponding to the length of the optical fiber cable 3 ranging from about 500 to 1000 km, is compensated for by the dispersion compensating fiber 6. Therefore, the dispersion caused by the length of the optical fiber cable 3 which ranges from about 500 to 1000 km can be compensated for at the terminal station 1. When the length of the optical fiber cable 3 is varied due to its repair, the dispersion caused by the optical fiber cable 3 is also varied. However, the varied dispersion can also be compensated for by adjusting the length of the dispersion compensating fiber 6.

Figure 9:
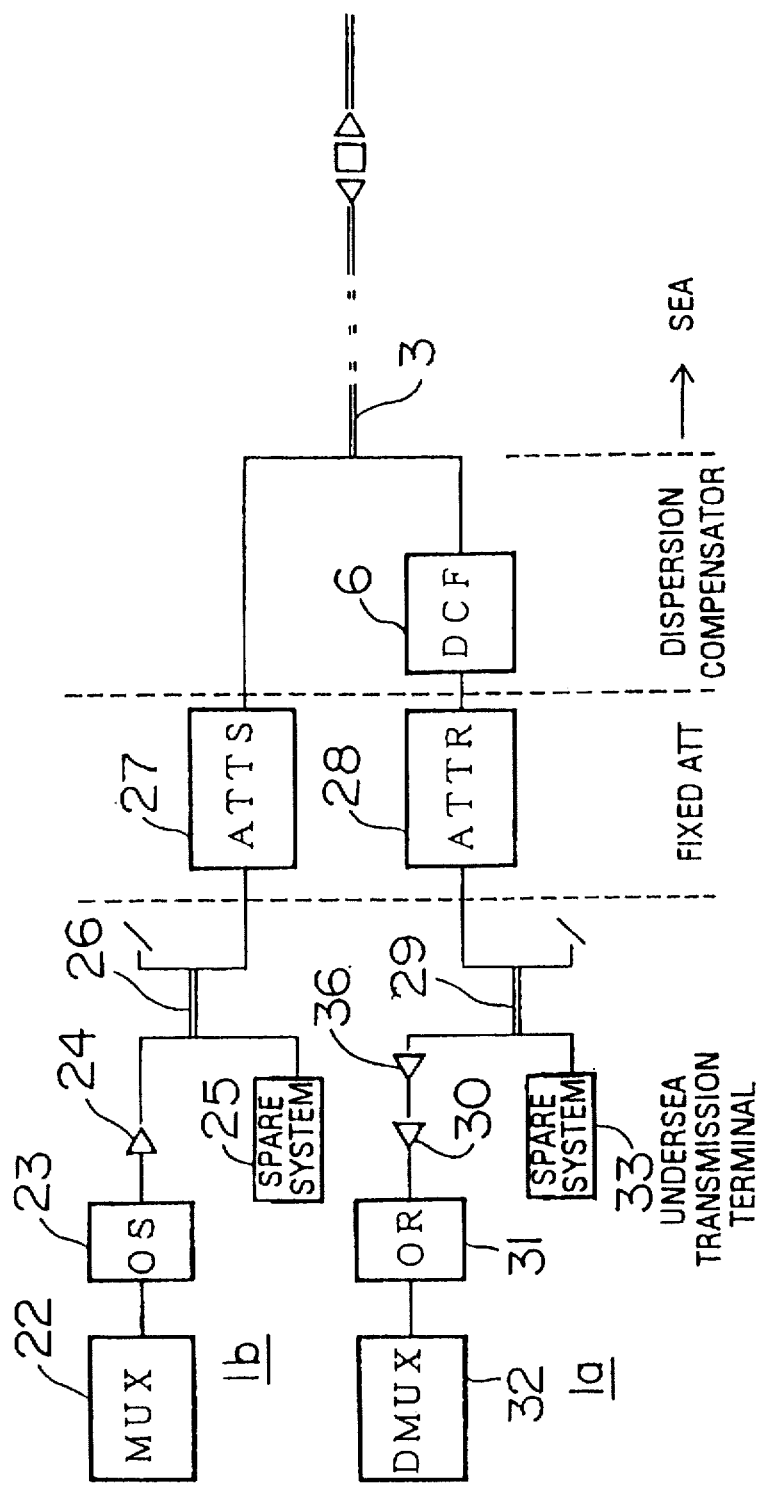
FIG. 9 is a block diagram of an apparatus for compensating for a dispersion in a submarine optical amplification and transmission system according to a fourth embodiment of the present invention.

FIG. 9 schematically shows in specific detail a dispersion compensating apparatus according to a fourth embodiment of the present invention. The dispersion compensating apparatus according to the fourth embodiment is basically the same as the dispersion compensating apparatus according to the third embodiment. Those parts of the dispersion compensating apparatus according to the fourth embodiment which are identical to those of the dispersion compensating apparatus according to the third embodiment are denoted by identical reference characters, and will not be described in detail below.

According to the fourth embodiment, as shown in FIG. 9, the amplifier 34 according to the third embodiment is dispensed with, and an optical amplifier 36 for optically amplifying an attenuation caused by the dispersion compensating fiber 6 is connected between the preamplifier 30 and the optical coupler 29.

Operation of and advantages offered by the dispersion compensating apparatus according to the fourth embodiment are the same as those of the dispersion compensating apparatus according to the third embodiment.

Figure 10:
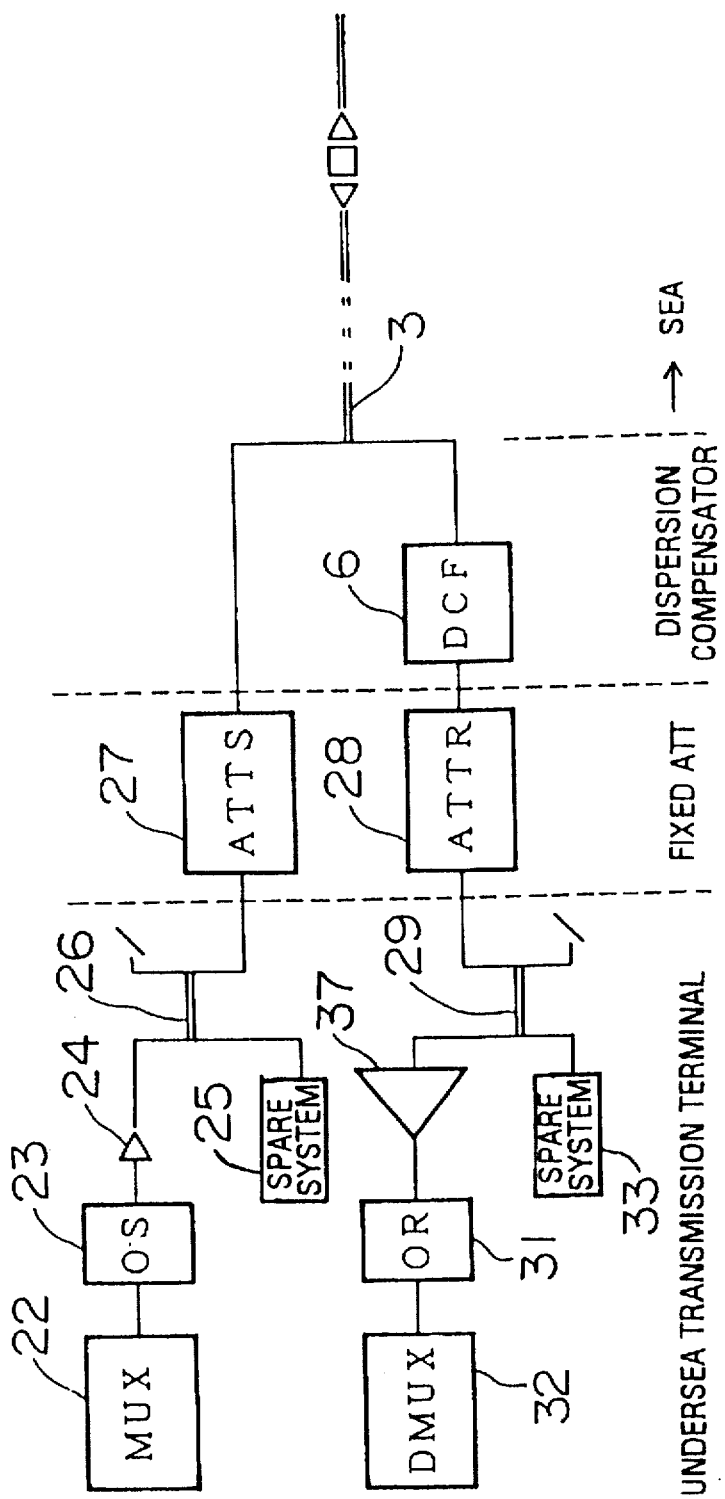
FIG. 10 is a block diagram of an apparatus for compensating for a dispersion in a submarine optical amplification and transmission system according to a fifth embodiment of the present invention.

FIG. 10 schematically shows in specific detail a dispersion compensating apparatus according to a fifth embodiment of the present invention. The dispersion compensating apparatus according to the fifth embodiment is basically the same as the dispersion compensating apparatus according to the third embodiment. Those parts of the dispersion compensating apparatus according to the fifth embodiment which are identical to those of the dispersion compensating apparatus according to the third embodiment are denoted by identical reference characters, and will not be described in detail below.

According to the fifth embodiment, as shown in FIG. 10, the amplifier 34 according to the third embodiment is dispensed with, and a preamplifier 37 is employed in place of the preamplifier 30 according to the third embodiment. The preamplifier 37 is set to a gain which is the sum of the gain of the preamplifier 30 according to the third embodiment and also a gain corresponding to the dispersion caused by the dispersion compensating fiber 6. For example, if the gain of the preamplifier 30 according to the third embodiment is 9.5 dB and the dispersion caused by the dispersion compensating fiber 6 is 7.5 dB, then the preamplifier 37 is set to a gain of 17 dB (=9.5 dB+7.5 dB).

Operation of and advantages offered by the dispersion compensating apparatus according to the fifth embodiment are the same as those of the dispersion compensating apparatus according to the third embodiment.

An apparatus for compensating for a dispersion in a submarine optical amplification and transmission system according to a sixth embodiment of the present invention will be described below with reference to FIGS. 3 and 11 through 13. The sixth embodiment resides in an arrangement of a terminal station.

Figure 3:
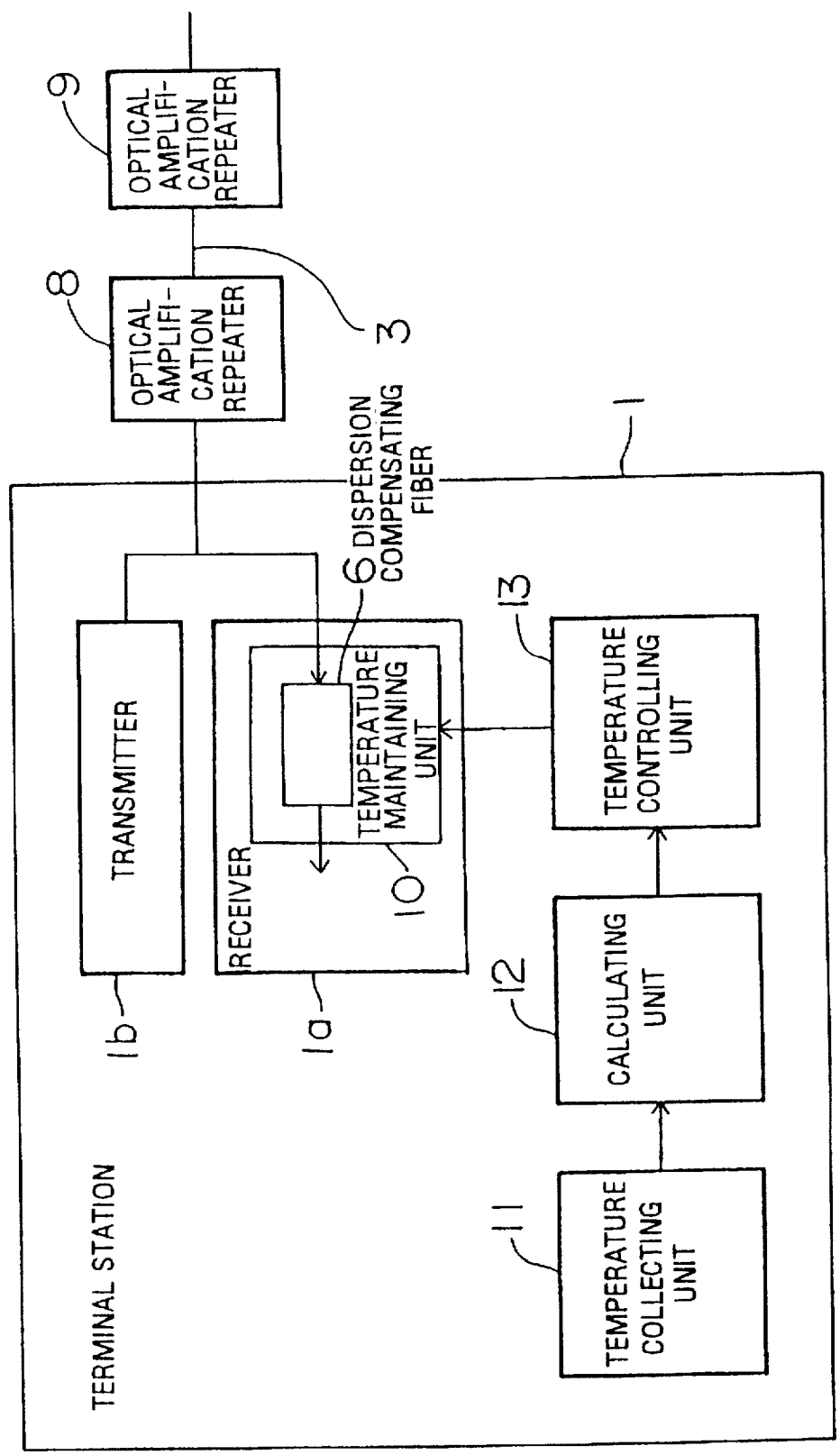
FIG. 3 is a block diagram illustrative of a third principle according to the present invention.

FIG. 3 shows a third principle according to the present invention, and the dispersion compensating apparatus according to the sixth embodiment is based on the second principle shown in FIG. 3.

As shown in FIG. 3, a submarine optical amplification and transmission system comprises an optical fiber cable 3 laid between two terminal stations 1, 2 (the terminal station 2 is not shown in FIG. 3), and a plurality of optical amplification repeaters 8, 9 placed at spaced locations in the optical fiber cable 3. The terminal station 1 has a receiver 1a and a transmitter 1b. The dispersion compensating apparatus according to the sixth embodiment includes a dispersion compensating fiber 6 disposed in the receiver 1a in the terminal station 1, a temperature maintaining unit 10 in the receiver 1a for maintaining the dispersion compensating fiber 6 at a predetermined temperature, a temperature collecting unit 11 in the terminal station 1 for collecting temperature information of seawater near the optical amplification repeaters 8, 9 from the optical amplification repeaters 8, 9, a calculating unit 12 in the terminal station 1 for calculating a deviation of the dispersion caused by the optical fiber cable 3 from a reference value by referring to a correlation table of temperatures and dispersions based on the temperature information collected by the temperature collecting unit 11, and a temperature controlling unit 13 in the terminal station 1 for controlling the predetermined temperature maintained by the temperature maintaining unit 10 based on the deviation calculated by the calculating unit 12.

The dispersion compensating fiber 6 comprises a single-mode fiber having a dispersion coefficient whose sign is opposite to the sign of the dispersion coefficient of the existing line (the optical fiber cable 3) at the transmitted wavelength and which is uniform in the longitudinal direction of the dispersion compensating fiber. The dispersion compensating fiber 6 has a maximum length in the range of from 20 to 30 km which may be adjusted to cancel out a dispersion (corresponding to the dispersion 109 shown in FIG. 17) caused by the optical fiber cable 3 as viewed from the receiver 1a. The dispersion compensating fiber 6 is wound around a bobbin in a compact structure.

The dispersing property of the optical fibers, including the dispersion compensating fiber 6, generally tends to vary depending on the ambient temperature. Although the dispersion caused by the optical fiber cable 3 varies depending on the temperature of seawater, a compensating dispersion created by the dispersion compensating fiber 6 can be varied by varying the ambient temperature around the dispersion compensating fiber 6, for thereby compensating for the variation of the dispersion caused by the optical fiber cable 3. The deviation compensating apparatus according to the sixth embodiment is based on this principle. Specifically, the temperature collecting unit 11 collects temperature information of seawater near the optical amplification repeaters 8, 9 from the optical amplification repeaters 8, 9. It has been customary to collect temperature information of seawater from each of optical repeaters.

Based on each piece of the collected temperature information, the calculating unit 12 refers to a correlation table of temperatures and dispersions as shown in FIG. 12 thereby to calculate a deviation of the dispersion caused by the optical fiber cable 3 from a reference value. As indicated by the correlation table shown in FIG. 12, temperature-dependent dispersions are already known with respect to lengths of the optical fiber cable 3 between the optical amplification repeaters. Therefore, the correlation table shown in FIG. 12 can be referred to for calculating a deviation of the dispersion caused by the optical fiber cable 3 from a reference value. The temperature controlling unit 13 controls the predetermined temperature maintained by the temperature maintaining unit 10 based on the deviation calculated by the calculating unit 12, i.e., varies the predetermined temperature maintained by the temperature maintaining unit 10 in order to cancel out the deviation of the dispersion caused by the optical fiber cable 3. The optical fiber cable 3 is combined with the conventional dispersion compensating fibers, or the dispersion compensating fibers 5a–5c according to the first embodiment, or the dispersion compensating fibers 16a–16c according to the second embodiment, for dispersion compensation.

Consequently, a variation of the dispersion caused by the optical fiber cable 3, due to a change in the ambient temperature, can be compensated for by the dispersion compensating fiber 6.

Figure 11:
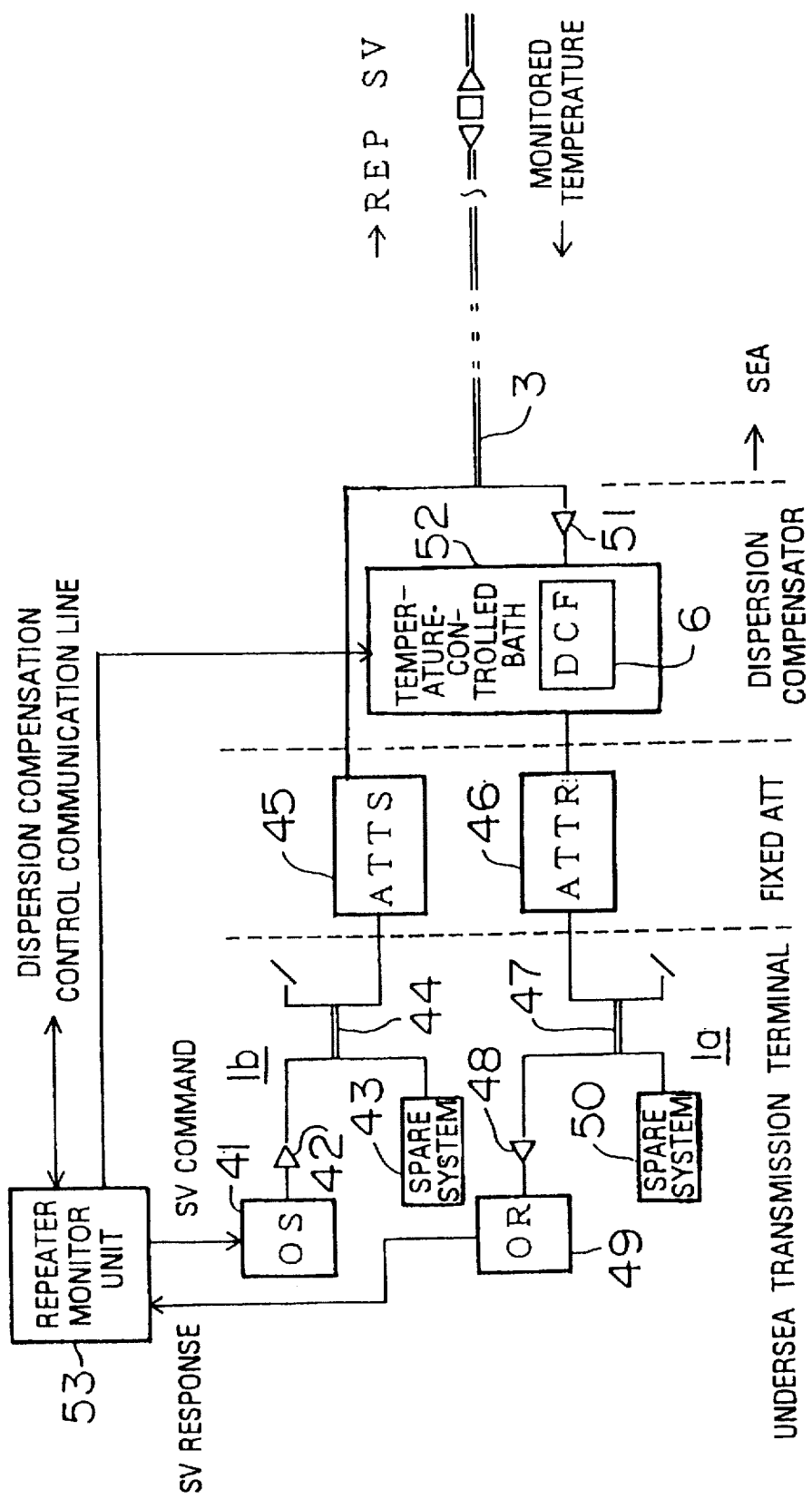
FIG. 11 is a block diagram of an apparatus for compensating for a dispersion in a submarine optical amplification and transmission system according to a sixth embodiment of the present invention.

FIG. 11 shows in detailed block form the dispersion compensating apparatus according to the sixth embodiment of the present invention. As shown in FIG. 11, the transmitter 1b has a multiplexer (not shown) for multiplexing a plurality of channel signals transmitted from a transmission network on land, an optical transmitter (OS) 41 for converting a multiplexed electric signal into an optical signal, and a postamplifier 42 for optically amplifying the optical signal up to a line signal level. The transmitter 1b also includes a cold-standby spare system 43 composed of elements which correspond respectively to the multiplexer, the optical transmitter 41, and the postamplifier 42, thus providing a redundant structure. The multiplexer, the optical transmitter 41, and the postamplifier 42, which constitute an active system, and the spare system 43 are connected through an optical coupler 44 to a transmission attenuator (ATTS) 45. The optical coupler 44 comprises a fiber-fused coupler. The transmission attenuator 45 serves to adjust an interface level between the transmitter 1b and the undersea transmission line of the optical fiber cable 3 and send an optical signal from the optical coupler 44 to the optical fiber cable 3.

The receiver 1a has a reception attenuator (ATTR) 46 for adjusting an interface level between the receiver 1a and the undersea transmission line of the optical fiber cable 3, and an optical coupler 47 for directing a received optical signal from the reception attenuator 46 to an active system or a spare system. The active system comprises a preamplifier 48, an optical receiver (OR) 49, and a demultiplexer (not shown) which have respective conversion functions that are a reversal of the functions of the multiplexer, the optical transmitter 41, and the postamplifier 42 of the receiver 1b, for sending a plurality of channel signals to the transmission network on land. The spare system, which comprises a cold-standby spare system 50, is composed of element which correspond respectively to the preamplifier 48, the optical receiver 49, and the demultiplexer, thus providing a redundant structure.

The receiver 1a also includes a dispersion compensating fiber 6 and an amplifier 51 which are connected between the reception attenuator 46 and the optical fiber cable 3. The dispersion compensating fiber 6 has its length adjusted to cancel out a dispersion (corresponding to the dispersion 109 shown in FIG. 17) caused by the optical fiber cable 3 as viewed from the receiver 1a. The amplifier 51 comprises an optical amplifier for optically amplifying an attenuation caused by the dispersion compensating fiber 6. The dispersion compensating fiber 6 is placed in a temperature-controlled bath or chamber 52 which serves to keep the dispersion compensating fiber 6 at a certain temperature that can be controlled by a control signal delivered from a repeater monitor unit 53.

The repeater monitor unit 53, which serves to monitor the optical amplification repeaters, is connected to a repeater monitor unit in the companion terminal station, which is the terminal station 2, through a dispersion compensation control communication line separate from the optical fiber cable 3. The repeater monitor unit 53 sends an SV signal to the optical transmitter 41, which superposes the received SV signal as a REP/SV signal on the optical signal to be transmitted. In response to the REP/SV signal, each of the optical amplification repeaters measures the temperature of the surface of its casing, i.e., the temperature of seawater, generates a monitored temperature signal, superposes the monitored temperature signal on the transmitted optical signal, and sends the resultant signal to the receiver 1a in the terminal station. The optical receiver 49 in the receiver 1a extracts the monitored temperature signal as an SV response signal from the received signal, and transmits the SV response signal to the repeater monitor unit 53. The repeater monitor unit 53 captures the ambient temperature of each of the optical amplification repeaters from the SV response signal. The above process of capturing the ambient temperature of each of the optical amplification repeaters has heretofore been carried out in the repeater monitor unit 53.

Based on the ambient temperature near each of the optical amplification repeaters, the repeater monitor unit 53 refers to the correlation table shown in FIG. 12.

The correlation table shown in FIG. 12 contains a correlation between ambient temperatures of repeater spans of the optical fiber cable 3 and dispersions caused by the repeater spans depending on the ambient temperatures. The repeater spans comprise respective zone cables which extend between the optical amplification repeaters and jointly make up the optical fiber cable 3. In FIG. 12, the optical fiber cable 3 is composed of repeater spans $RS_1$–$RS_n$. FIG. 12 shows dispersions caused by the respective repeater spans $RS_1$–$RS_n$ at the various ambient temperatures.

Referring back to FIG. 11, the repeater monitor unit 53 obtains the dispersions caused by the respective repeater spans $RS_1$–$RS_n$ from the correlation table shown in FIG. 12 based on the captured ambient temperatures, calculates deviations of the captured dispersions from a reference dispersion value, and adds the calculated deviations into an overall deviation caused by the optical fiber cable 3. Then, the repeater monitor unit 53 refers to a conversion table shown in FIG. 13 to convert the overall deviation into a temperature to be maintained around the dispersion compensating fiber 6 for canceling out the overall deviation caused by the optical fiber cable 3 with the dispersion compensating fiber 6.

The conversion table shown in FIG. 13 represents a relationship between ambient temperatures of the dispersion compensating fiber 6, i.e., temperatures to be controlled in the temperature-controlled bath 52, and dispersions caused by the dispersion compensating fiber 6.

In FIG. 11, the repeater monitor unit 53 sends the obtained temperature to the temperature-controlled bath 52, and controls the temperature-controlled bath 52 to maintain the temperature therein.

In this manner, the temperature-dependent deviation of the dispersion that is brought about by the optical fiber cable 3 is compensated for by the dispersion compensating fiber 6.

Figure 14:
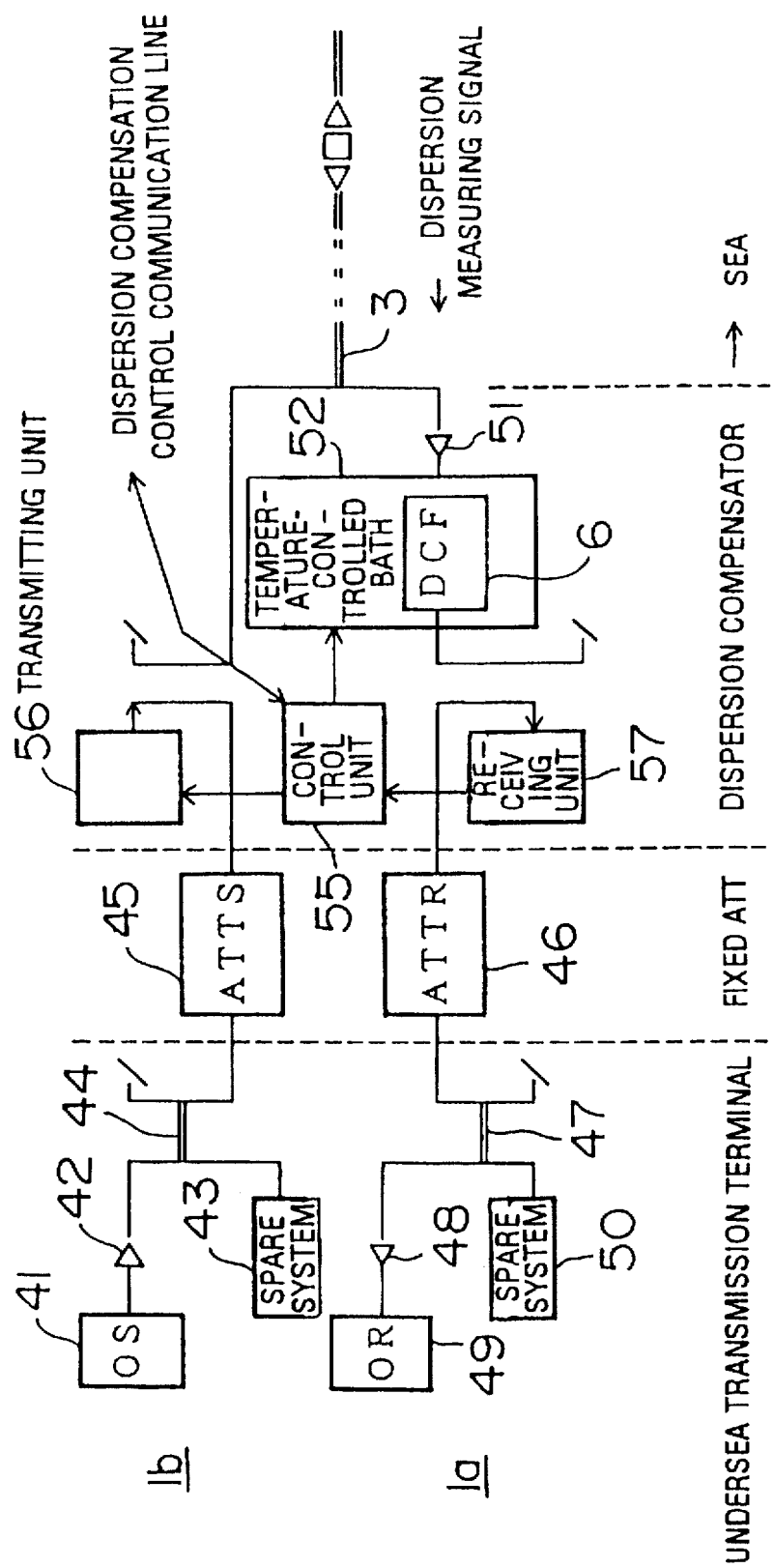
FIG. 14 is a block diagram of an apparatus for compensating for a dispersion in a submarine optical amplification and transmission system according to a seventh embodiment of the present invention.

FIG. 14 schematically shows in specific detail a dispersion compensating apparatus according to a seventh embodiment of the present invention. The dispersion compensating apparatus according to the seventh embodiment is basically the same as the dispersion compensating apparatus according to the sixth embodiment. Those parts of the dispersion compensating apparatus according to the seventh embodiment which are identical to those of the dispersion compensating apparatus according to the sixth embodiment are denoted by identical reference characters, and will not be described in detail below.

According to the seventh embodiment, as shown in FIG. 14, the repeater monitor unit 53 according to the sixth embodiment is dispensed with, and the dispersion compensating apparatus additionally has a control unit 55 for controlling the temperature of the temperature-controlled bath 52, a transmitting unit 56 for transmitting a dispersion measuring signal, and a receiving unit 57 for receiving a dispersion measuring signal. The control unit 55 is connected to a control unit in the companion terminal station through a dispersion compensation control communication line separate from the optical fiber cable 3. When a dispersion caused by the optical fiber cable 3 is to be measured, the control unit 55 requests the control unit in the companion terminal station through the dispersion compensation control communication line to transmit a dispersion measuring signal. In response to the request, the control unit in the companion terminal station transmits the dispersion measuring signal through the optical fiber cable 3. The receiving unit 57 receives the transmitted dispersion measuring signal, and detects a dispersion caused by the optical fiber cable 3 as viewed from the receiver 1a in the terminal station 1 based on the received state of the dispersion measuring signal. The receiving unit 57 then supplies the detected dispersion to the control unit 55. The transmitting unit 56 serves to transmit a dispersion measuring signal through the optical fiber cable 3 in response to a request from the control unit in the companion terminal station.

When the control unit 55 is supplied with the detected dispersion, the control unit 55 refers to the conversion table shown in FIG. 13, and converts the detected dispersion into a corresponding temperature to be kept in the temperature-controlled bath 52. The control unit 55 then sends the obtained temperature to the temperature-controlled bath 52, and controls the temperature-controlled bath 52 to maintain the temperature therein.

In this manner, a deviation of the dispersion caused by the optical fiber cable 3, due to aging, a repair, etc., can be compensated for by varying the temperature of the dispersion compensating fiber 6.

In the seventh embodiment, the dispersion measuring signal has to be transmitted through the optical fiber cable 3 when ordinary optical communications are not being carried out through the optical fiber cable 3. Therefore, it is the practice with the seventh embodiment to measure and compensate for a deviation of the dispersion caused by the optical fiber cable 3 when the submarine optical amplification and transmission system starts to operate or suffers faults.

Figure 15:
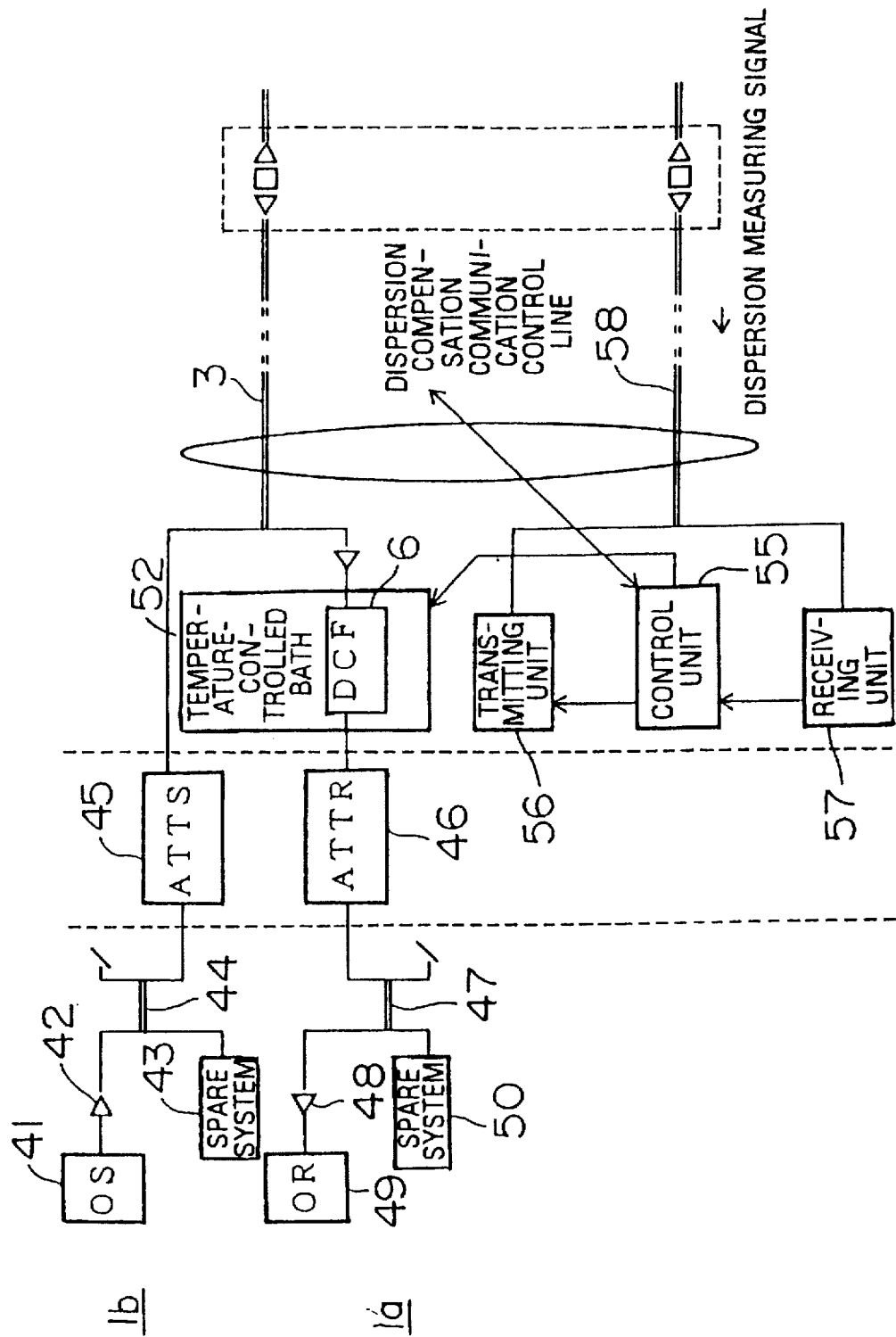
FIG. 15 is a block diagram of an apparatus for compensating for a dispersion in a submarine optical amplification and transmission system according to an eighth embodiment of the present invention.
Figure 16:
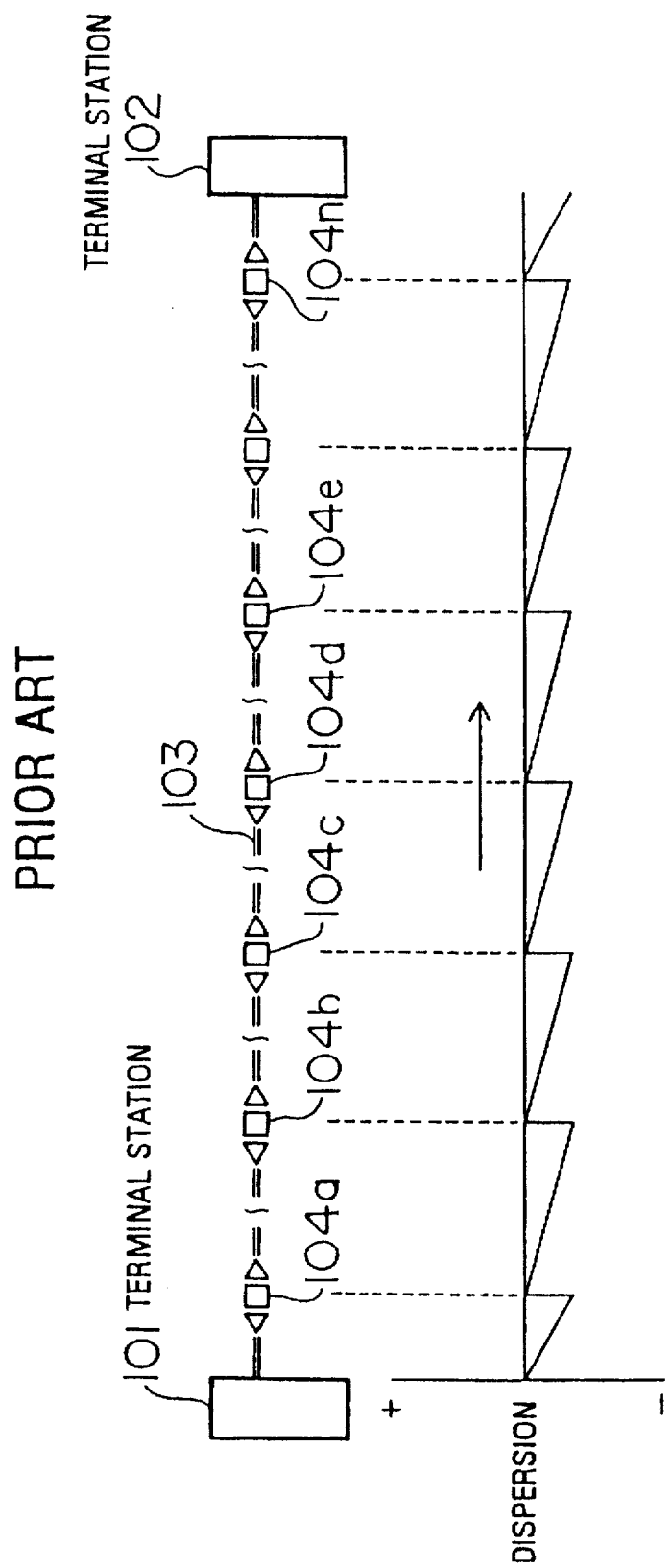
FIG. 16 is a schematic diagram of a conventional optical fiber transmission system operating on the regenerative relay principles.

FIG. 15 schematically shows in specific detail a dispersion compensating apparatus according to an eighth embodiment of the present invention. The dispersion compensating apparatus according to the eighth embodiment is basically the same as the dispersion compensating apparatus according to the seventh embodiment. Those parts of the dispersion compensating apparatus according to the eighth embodiment which are identical to those of the dispersion compensating apparatus according to the seventh embodiment are denoted by identical reference characters, and will not be described in detail below.

According to the eighth embodiment, as shown in FIG. 15, the dispersion compensating apparatus additionally includes a dispersion measuring optical fiber cable 58, separate from the optical fiber cable 3, connected to the transmitting unit 56 and the receiving unit 57. The dispersion measuring optical fiber cable 58 extends along the optical fiber cable 3, and has the same dispersing property as that of the optical fiber cable 3.

In response to a request from the control unit 55, the transmitting unit in the companion terminal station sends a dispersion measuring signal through the dispersion measuring optical fiber cable 58. The receiving unit 57 receives the transmitted dispersion measuring signal, and estimates the dispersion caused by the optical fiber cable 3 as viewed from the receiver 1a in the terminal station 1 based on the received state of the dispersion measuring signal. The receiving unit 57 then supplies the detected dispersion to the control unit 55. Subsequently, the dispersion compensating apparatus operates in the same manner as the dispersion compensating apparatus according to the seventh embodiment shown in FIG. 14.

Since the dispersion measuring signal is transmitted through the dispersion measuring optical fiber cable 58, a deviation of the dispersion caused by the optical fiber cable 3 can be measured and compensated for at all times while ordinary optical communications are being carried out through the optical fiber cable 3.

According to the present invention, as described above, dispersion compensating fibers are housed in the casings of optical amplifiers that are placed at dispersion compensating intervals in an optical fiber cable. This arrangement allows the optical fiber cable and the dispersion compensating fibers to be repaired with ease.

Furthermore, a receiver in a terminal station has a dispersion compensating fiber and an optical amplifier for amplifying an attenuation caused by the dispersion compensating fiber. This arrangement makes it possible to compensate for a dispersion caused by an optical fiber cable at the terminal station.

Moreover, a receiver in a terminal station has a dispersion compensating fiber, and the temperature of the dispersion compensating fiber is controlled depending on a temperature of or a dispersion caused by an optical fiber cable. This arrangement is effective in reliably compensating for a change in the dispersion caused by the optical fiber cable, due to aging, a temperature change, or a repair.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for compensating for a dispersion which occurs in a submarine optical amplification and transmission system that operates on optical amplification relay principles, comprising:

an optical fiber cable extending between two terminal stations;

a plurality of optical amplifiers placed in said optical fiber cable, said optical amplifiers having respective casings; and a dispersion compensating fiber housed in the casing of each of those of said optical amplifiers which are positioned at dispersion compensating intervals over said optical fiber cable, said dispersion compensating fiber being wound around a plurality of parallel bobbin units which are housed in the corresponding casing.

2. An apparatus for compensating for a dispersion which occurs in a submarine optical amplification and transmission system that operates on optical amplification relay principles, comprising:

an optical fiber cable extending between two terminal stations; a plurality of joint devices placed in said optical fiber cable, said joint devices having respective casings and not having an optical amplifier therein; and a dispersion compensating fiber housed in the casing of each of those of said joint devices which are positioned at dispersion compensating intervals over said optical fiber cable.

3. An apparatus for compensating for a dispersion which occurs in a submarine optical amplification and transmission system that operates on optical amplification relay principles, comprising:

a terminal station connected to an optical fiber cable, said terminal station having a receiver;

a dispersion compensating fiber disposed in said receiver, said dispersion compensating fiber having a length which is adjusted to cancel out a dispersion caused by the optical fiber cable, and said dispersion compensating fiber being would around a bobbin in a compact structure; and optical amplifying means disposed in said receiver, for amplifying an attenuation caused by said dispersion compensating fiber.

4. An apparatus according to claim 3, wherein said optical amplifying means is connected between said dispersion compensating fiber and said optical fiber cable.

5. An apparatus according to claim 3, wherein said receiver has an optical preamplifier, said optical amplifying means being connected between said optical preamplifier and said dispersion compensating fiber.

6. An apparatus according to claim 3, wherein said receiver has an optical preamplifier, said optical amplifying means comprising means for increasing a gain of said optical preamplifier by an attenuation caused by said dispersion compensating fiber.

7. An apparatus for compensating for a dispersion which occurs in a submarine optical amplification and transmission system that operates on optical amplification relay principles, comprising:

an optical fiber cable extending between two terminal stations each having a receiver;

a plurality of optical amplification repeaters placed in said optical fiber cable;

a dispersion compensating fiber disposed in said receiver;

temperature maintaining means for maintaining said dispersion compensating fiber at a predetermined temperature;

temperature collecting means disposed in one of said terminal stations, for collecting temperature information of seawater near said optical amplification repeaters from said optical amplification repeaters;

calculating means disposed in said one of the terminal stations, for calculating a deviation of a dispersion caused by said optical fiber cable from a reference value by referring to a correlation table of temperatures and dispersions based on the temperature information collected by said temperature collecting means; and temperature controlling means disposed in said one of the terminal stations, for controlling the predetermined temperature maintained by said temperature maintaining means based on the deviation calculated by said calculating means.

8. An apparatus for compensating for a dispersion which occurs in a submarine optical amplification and transmission system that operates on optical amplification relay principles, comprising:

an optical fiber cable extending between two terminal stations each having a receiver;

a dispersion compensating fiber disposed in said receiver;

temperature maintaining means for maintaining said dispersion compensating fiber at a predetermined temperature;

requesting means disposed in one of said terminal stations, for requesting the other of said terminal stations to sent a dispersion measuring signal;

dispersion detecting means disposed in said one of the terminal stations, for detecting a dispersion caused by said optical fiber cable at a location where said one of the terminal stations is connected to said optical fiber cable, based on the dispersion measuring signal sent from said other of the terminal stations; and temperature controlling means for controlling the predetermined temperature maintained by said temperature maintaining means based on the dispersion detected by said dispersion detecting means.

9. An apparatus according to claim 8, wherein said dispersion detecting means comprises means for receiving the dispersion measuring signal sent from said other of the terminal stations through said optical fiber cable, and detecting the dispersion caused by said optical fiber cable at said location based on the received dispersion measuring signal.

10. An apparatus according to claim 8, further comprising:

a second optical fiber cable extending between said terminal stations parallel to said optical fiber cable;

said dispersion detecting means comprising means for receiving the dispersion measuring signal sent from said other of the terminal stations through said second optical fiber cable, and detecting the dispersion caused by said optical fiber cable at said location based on the received dispersion measuring signal.

11. An apparatus for compensating for a dispersion which occurs in a submarine optical amplification and transmission system that operates on optical amplification relay principles, comprising:

an optical fiber cable extending between two terminal stations each having a receiver;

a plurality of optical amplification repeaters placed in said optical fiber cable, said optical amplification repeaters having respective casings;

a dispersion compensating fiber housed in the casing of each of those of said optical amplification repeaters which are positioned at dispersion compensating intervals over said optical fiber cable;

a second dispersion compensating fiber disposed in said receiver;

optical amplifying means disposed in said receiver, for amplifying an attenuation caused by said second dispersion compensating fiber;

temperature maintaining means for maintaining said second dispersion compensating fiber at a predetermined temperature;

temperature collecting means disposed in one of said terminal stations, for collecting temperature information of seawater near said optical amplification repeaters from said optical amplification repeaters;

calculating means disposed in said one of the terminal stations, for calculating a deviation of a dispersion caused by said optical fiber cable from a reference value by referring to a correlation table of temperatures and dispersions based on the temperature information collected by said temperature collecting means; and temperature controlling means disposed in said one of the terminal stations, for controlling the predetermined temperature maintained by said temperature maintaining means based on the deviation calculated by said calculating means.

12. An apparatus for compensating for a dispersion which occurs in a submarine optical amplification and transmission system that operates on optical amplification relay principles, comprising:

an optical fiber cable extending between two terminal stations each having a receiver;

a plurality of joint devices placed in said optical fiber cable, said joint devices having respective casings;

a dispersion compensating fiber housed in the casing of each of those of said joint devices which are positioned at dispersion compensating intervals over said optical fiber cable;

a plurality of optical amplification repeaters placed in said optical fiber cable;

a second dispersion compensating fiber disposed in said receiver;

optical amplifying means disposed in said receiver, for amplifying an attenuation caused by said second dispersion compensating fiber;

temperature maintaining means for maintaining said second dispersion compensating fiber at a predetermined temperature;

temperature collecting means disposed in one of said terminal stations, for collecting temperature information of seawater near said optical amplification repeaters from said optical amplification repeaters;

calculating means disposed in said one of the terminal stations, for calculating a deviation of a dispersion caused by said optical fiber cable from a reference value by referring to a correlation table of temperatures and dispersions based on the temperature information collected by said temperature collecting means; and temperature controlling means disposed in said one of the terminal stations, for controlling the predetermined temperature maintained by said temperature maintaining means based on the deviation calculated by said calculating means.

* * * * *